United States Patent [19]

Labana et al.

[11] 3,880,947

[45] Apr. 29, 1975

[54] POWDER COATING COMPOSITIONS INCLUDING CARBOXYL TERMINATED POLYAMIDE CROSSLINKING AGENTS

[75] Inventors: Santokh S. Labana, Dearborn Heights; Yun-Feng Chang, Plymouth, both of Mich.

[73] Assignee: Ford Motor Company, Dearborn, Mich.

[22] Filed: Dec. 18, 1973

[21] Appl. No.: 425,741

[52] U.S. Cl..... 260/830 P; 260/30.6 R; 260/31.8 E; 260/37 EP; 260/42.28; 260/824 EP; 260/830 R; 260/830 TW; 260/835; 260/836; 260/DIG. 16; 260/DIG. 17
[51] Int. Cl..................... C08g 45/12; C08g 45/05
[58] Field of Search ......................... 260/836, 830 P

[56] References Cited
UNITED STATES PATENTS

| | | | |
|---|---|---|---|
| 3,070,654 | 12/1962 | Roeser | 260/836 |
| 3,222,419 | 12/1965 | Jubilee | 260/836 |
| 3,297,621 | 1/1967 | Taft | 260/836 |
| 3,514,419 | 5/1970 | Darlow | 260/836 |
| 3,595,944 | 7/1971 | Manning | 260/836 |
| 3,781,380 | 12/1973 | Labana | 260/830 TW |
| 3,808,114 | 4/1974 | Tsuchihara | 260/836 |

*Primary Examiner*—Paul Lieberman
*Attorney, Agent, or Firm*—Roger L. May; Keith L. Zerschling

[57] ABSTRACT

Powder coating compositions are disclosed which, exclusive of pigments and nonreactive components, comprise a coreactive mixture of: (A) a copolymer of between about 8 and about 30 weight percent of a glycidyl ester of a monoethylenically unsaturated acid and between about 92 and about 70 weight percent of other monoethylenically unsaturated monomers, said copolymer having a glass transition temperature in the range of 40°C. to 90°C. and a number average molecular weight ($M_n$) of between about 2500 and about 8500; and (B) a carboxyl terminated polyamide crosslinking agent in the amount of between about 0.8 and about 1.2 carboxyl groups for each epoxy group in the copolymer.

21 Claims, No Drawings

POWDER COATING COMPOSITIONS INCLUDING CARBOXYL TERMINATED POLYAMIDE CROSSLINKING AGENTS

This application relates to thermosetting powder paint compositions which are useful for providing protective and decorative surface coatings on a variety of substrates including glass, metal and other substrates which can withstand the curing temperature of the powder.

Powder coating compositions have become increasingly desirable in recent years for various reasons including those relating to ecology, health and safety. In particular, powder coating compositions are preferable to liquid paints. Such paints contain large amounts of solvents which must be volatilized after application, thus resulting in solvents escaping into the atmosphere and creating health and safety hazards as well as undersirable pollution problems. The powder coating compositions of this invention, on the other hand, release little, if any, volatile material when cured. In addition, the powders have good stability at room temperature, have fast cure times at elevated temperatures and form hard coatings exhibiting excellent solvent resistance.

SUMMARY OF THE INVENTION

The powder coating compositions of this invention, exclusive of pigments and other nonreactive components, comprise a coreactable mixture of: (A) a copolymer of between about 8 and about 30 weight percent of glycidyl ester of monoethylenically unsaturated acid and between about 92 and about 70 weight percent of other monoethylenically unsaturated monomers, said copolymer having a glass transition temperature in the range of 40°C. to 90°C. and a number average molecular weight ($\overline{M}_n$) of between about 2500 and about 8500; and (B) a carboxyl terminated polyamide in the amount of between about 0.8 and 1.2 carboxyl groups for each epoxy group in the copolymer. In addition, the powder coating compositions may include additives such as catalysts, flow control agents, antistatic agents, pigments, plasticizers, etc.

PRIOR ART

The use of glycidyl methacrylate copolymers and dicarboxylic acid crosslinking agents in a liquid paint system is described in U.S. Pat. No. 2,857,354. However, the powder coating compositions of this invention are substantially different than the liquid paint compositions described in the examples of that patent. The difference can be best illustrated by attempting to prepare powder coating compositions by evaporating the solvents from the liquid paint systems described in the examples of the patent. Dry powders cannot be prepared from the compositions of Examples 4 and 5 of the patent. Powders prepared from the compositions of Examples 1, 2, 3 and 6, when deposited on a metal panel, do not fuse together to form a smooth and glossy film when the panels are baked at 150° to 200°C. for 20 minutes. The baked coatings on test panels are not smooth, but rather, are rough. Also, the baked coatings exhibit very low gloss, poor adhesion and lack of flexibility. It, therefore, can be concluded that compositions which are generally suitable for liquid paints are not necessarily made suitable for powder paints merely by evaporating the solvents therefrom.

The use of a dicarboxylic acid as a crosslinking agent for glycidyl methacrylate terpolymers is mentioned in U.S. Pat. No. 3,058,947. In order to test these materials, compositions of Example VII of the patent are dried by evaporating solvents under vacuum. The materials are ground to pass through a 200 mesh screen. Samples of the ground powder are deposited on metal panels and baked at 160°C. for 45 minutes. The coatings obtained show an abundance of craters, are inferior in gloss and smoothness, and lack the impact properties described in Example VII. It is, therefore, concluded that there is a substantial difference in paint films produced on a panel when the coating is produced on one hand by a liquid system and, on the other hand, by a powder system. Other improvements specific to the powders are needed in order to obtain paints of acceptable quality. The reason for the difference in properties and appearance between powder coatings derived by solvent evaporation from such liquid paints and the liquid paints themselves is not clear. It is, however, certain that the powder obtained by drying such a liquid paint composition is not useful as a powder coating composition.

DETAILED DESCRIPTION OF THE INVENTION

Epoxy Functional Copolymer

The principal material in the powder coating compositions of this invention is an epoxy functional copolymer which may be formed by conventional free radical induced polymerization of suitable unsaturated monomers. The term "copolymer" as used herein means a polymer of two or more different monomers.

The copolymers used in the invention contain between about 8 and about 30 weight percent, preferably between about 10 and about 25 weight percent, and still more preferably between about 12 and about 20 weight percent of a glycidyl ester of a monoethylenically unsaturated carboxylic acid, e.g., glycidyl acrylate and glycidyl methacrylate. These monomers provide the copolymer with its pendant epoxy functionality.

The remainder of the monomers forming the epoxy functional copolymer, i.e., between about 92 and about 70 weight percent, preferably between about 90 and about 75 weight percent, and most preferably between about 88 and about 80 weight percent, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of both acrylic and methacrylic acids) as well as mixtures of acrylates and vinyl hydrocarbons. Preferably, in excess of 50 weight percent of the total of the copolymer monomers are esters of $C_1 - C_{12}$ monohydric alcohols and acrylic or methacrylic acid, e.g., methyl methacrylate, ethyl acrylate, butyl acrylate, butyl methacrylate, hexyl acrylate, 2-ethylhexyl acrylate, lauryl methacrylate, etc. Among the monovinyl hydrocarbons suitable for use in forming the copolymer are those containing 8 to 12 carbon atoms and including styrene, alpha methyl styrene, vinyl toluene, t-butyl styrene and chlorostyrene. When such monovinyl hydrocarbons are employed, they should constitute less than 50 weight percent of the copolymer. Other vinyl monomers such as vinyl chloride, acrylonitrile, methacrylonitrile and vinyl acetate may be included in the copolymer as modifying monomers. However, when employed, these modifying monomers should constitute only between about 0 and about 35 weight percent of the monomers in the copolymer.

The epoxy functional copolymers used in the powder coating compositions of this invention have a glass transition temperature (Tg) betwwen about 40°C. and about 90°C., preferably between about 50°C. and about 80°C., and most preferably between about 50°C. and about 70°C. The molecular weight ($\overline{M}_n$) range for the copolymer may be between about 2500 and about 8500, preferably between about 3,000 and about 6,500 more preferably between about 3,000 and about 4,000. A preferred copolymer has a glass transition temperature between about 50°C. and about 80°C. and a molecular weight of between about 3,000 and about 6,500. A still more preferred copolymer has a glass transition temperature between about 55°C. and about 70°C. and a molecular weight between about 3,000 and about 4,000.

In preparing the copolymer, the epoxy functional monomer and the remaining monoethylenically unsaturated monomers are mixed and reacted by conventional free radical initiated polymerization in such proportions as to obtain the copolymer desired. A large number of free radical initiators are known to the art and are suitable for this purpose. These include: benzoyl peroxide; lauryl peroxide; t-butylhydroxy peroxide; acetylcyclohexane sulfonyl peroxide; diisobutyl peroxide; di(2-ethylhexyl) peroxydicarbonate; diisopropyl peroxydicarbonate; t-butylperoxypivalate; decanoyl peroxide, azobis (2-methyl-propionitrile), etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a non-solvent for the copolymer such as hexane, octane, or water under suitable agitation conditions. The copolymer thus obtained is then further dried so that it contains less than 3 percent of the materials that volatilize at the temperatures used for baking the coatings. Alternatively, the copolymer can be obtained by evaporating the solvents under vacuum or by employing spray drying techniques.

These copolymers can also be prepared by emulsion polymerization, suspension polymerization, bulk polymerization or other suitable methods. In these methods of preparing the copolymers, chain transfer agents may be required to control the molecular weight of the copolymer to a desired range. However, when the chain transfer agents are used care must be taken so that they do not decrease the shelf stability of the powder by causing premature chemical reaction. The solid copolymers obtained by these methods must also be dried to contain less than 3% of the materials that volatilize at the temperatures used for baking the coatings.

The molecular weight and molecular weight distribution of the epoxy functional copolymer is important in obtaining outstanding powder coating compositions. While the molecular weight ($\overline{M}_n$) ranges from about 2500 to about 8500, the copolymer component must not contain significant amounts of higher molecular weight fractions. No more than 5% of the copolymer should be of molecular weight greater than 20,000 and the molecular weight distribution as measured by the ratio of weight average molecular weight to number average molecular weight ($\overline{M}_w/\overline{M}_n$) should be in the range of 1.6 to 3.0. The preferred range of molecular weight distribution is in the range of 1.7 to 2.2.

Carboxyl Terminated Polyamide

The crosslinking agent of the powder coating compositions of the invention is a carboxyl terminated polyamide bearing at least two carboxyl groups per molecule and which is present in an amount ranging from about 0.8 to about 1.2 carboxyl groups for each epoxy group in the above-discussed copolymer. The carboxyl groups of the carboxyl terminated polyamide react with the epoxy groups of the copolymer upon exposure to heat to form a hard cured film.

The carboxyl terminated polyamides preferred for use as crosslinking agents in the powder coating compositions of the invention have number average molecular weights ($\overline{M}_n$) between about 500 and about 3000, preferably between about 700 and about 1500 and have the general structure:

$$HO-\overset{O}{\overset{\|}{C}}\left[R_1 - \overset{O}{\overset{\|}{C}} - NH - R_2 - NH - \overset{O}{\overset{\|}{C}}\right]_n R_1 - \overset{O}{\overset{\|}{C}} - OH$$

where $n$ is between 1 and 10, preferably between 1 and 5; and $R_1$ and $R_2$ are selected from the group consisting of: (1) alkyl groups containing 2 to 12 carbon atoms; (2) aromatic groups; (3) heterocyclic groups; and 4 alicyclic groups. Such carboxyl terminated polyamides may be prepared in accordance with conventional procedures which are well known in the prior art. For example, the carboxyl terminated polyamide may be prepared by: (1) reacting a dicarboxylic acid and a diamine; (2) reacting a diacyl halide and a diamine; or (3) reacting a dicarboxylic anhydride and a diamine. The exact reaction conditions for forming the carboxyl terminated polyamides will be apparent to those skilled in the art and are also more fully described in the detailed examples set forth hereinafter.

The diamines which are reacted with the dicarboxylic acid, the dicarboxylic acid anhydride or the acyl halide may be selected from aliphatic diamines, aromatic diamines, alicyclic diamines and heterocyclic diamines. Representative of the many suitable diamines of these various types are: tetramethylene diamine; hexamethylene diamine; octamethylene diamine; dodecamethylene diamine; 1,4-phenylene diamine; benzidine; p,p'-diaminobenzophenone; 4,4'-diaminodiphenyl sulfone, 4,4'-diamino diphenyl ether, 1,4 cyclohexane diamine; 1,2-cyclohexane diamine; 2,3 bicycloheptane diamine; 2,3 - bicyclooctane diamine; trans-2,5 dimethylpiperazine, Bis (3,4 diaminophenyl) sulfone; triethylenetetramine, etc.

The dicarboxylic acids which may be reacted with the above-discussed diamines may be selected from aliphatic dicarboxylic acids, aromatic dicarboxylic acids, alicyclic dicarboxylic acids, and heterocyclic dicarboxylic acids. Representative of the many dicarboxylic acids falling within these categories are: adipic acid; azelaic acid; o-phthalic acid; terephthalic acid; 1,2-cyclohexane dicarboxylic acid; 1,4-cyclo-hexane dicarboxylic acid; 2,3-bicycloheptene dicarboxylic acid; 2,3-bicyclooctane dicarboxylic acid; 4,4'-sulfonyldibenzoic aicd, etc. The dicarboxylic acid anhydrides and acyl halides which may be reacted with the diamines to form the carboxyl terminated polyamides are these formed from dicarboxylic acids falling within the above categories.

Additional Additives

The coating compositions formed in accordance with the teachings of this invention may include a small amount, generally from about 0.05% by weight to about 1.0% by weight of the total weight of the powder composition, of a catalyst in order to increase the crosslinking rate of the powder coating during baking. Baking temperatures ordinarily are in the range of about 130°C. to about 200°C. and the catalyst should produce a gel time at the baking temperature of between about one minute and about 40 minutes. Preferably, however, the gel time is in the range of about 1 to about 12 minutes and most preferably is in the range of about 2 to about 8 minutes. Among the many suitable catalysts, which are preferably solid at room temperature and have a melting point of from 50°C. to 200°C. are tetraalkylammonium salts, imidazole type catalysts, tertiary amines and metal salts of organic carboxylic acids. Suitable tetraalkyl ammonium salt catalysts include: tetrabutyl ammonium chloride (bromide or iodide); tetraethyl ammonium chloride (bromide or iodide); tetramethyl ammonium chloride (bromide or iodide); trimethyl benzyl ammonium chloride, dodecyl dimethyl (2-phenoxyethyl) ammonium bromide and diethyl (2-hydroxy ethyl) methyl ammonium bromide. Suitable catalysts of the imidazole type include: 2-methyl-4-ethyl imidazole, 2-methyl imidazole, imidazole, 2-[(N-benzylanilino) methyl] - 2-imidazoline phosphate and 2-benzyl-2-imidazoline hydrochloride. Suitable tertiary amine catalysts for the powder coating compositions of this invention include: triethylenediamine, N,N-diethylcyclohexylamine, and N-methyl morpholine. The metal salts of organic carboxylic acids which are catalysts for the powder coatings of the invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate.

The powder paint composition also may advantageously include a flow control agent in an amount ranging from about 0.05 weight percent to about 4.0 weight percent of the total powder composition. In general the flow control agent should be a polymer having a number average molecular weight of at least 1,000 and a glass transition temperature at least 50°C. below the glass transition temperature of the epoxy functional copolymer. This flow control agent may be an acrylic polymer which may be prepared by polymerization of acrylate and methacrylate monomers in bulk or in suitable solvents using well known free radical initiators. The amount of initiator and polymerization conditions are chosen so that the polymer has a molecular weight ($\overline{M}_n$) above 1,000, preferably above 5,000 and most preferably between about 6,000 and about 20,000. Among the preferred acrylic polymers useful as flow control agents are polylauryl acrylate, polybutyl acrylate, poly (2-ethylhexyl acrylate), polylauryl methacrylate and polyisodecyl methacrylate.

Although acrylate flow control agents are preferred, fluorinated polymers having a surface tension, at the baking temperature of the powder, lower than that of the copolymer used in the mixture may be employed. Preferred flow control agents, if the agent is a fluorinated polymer are esters of polyethyleneglycol or polypropylene glycol and fluorinated fatty acids. For example, an ester of polyethyleneglycol of molecular weight of over 2,500 and perfluorooctanoic acid is a useful flow control agent. Polymeric siloxanes of molecular weight over 1,000, advantageously 1,000 to 20,000, may also be useful as flow control agents, e.g., alkyl substituted siloxanes such as polydimethyl siloxane, or polymethylphenyl siloxane, polydiphenyl siloxane, and halogenated siloxanes such as poly (3,3,3-trifluoropropyl-methyl siloxane), poly (perfluorodimethyl siloxane), poly (pentafluoro-phenyl methyl siloxane), etc.

Since the powder coating compositions of the invention may be applied to articles by electrostatic spray techniques, the composition may include a small weight percent of an antistatic agent. In particular, the anti-static agent is included in a range of from about 0.05 to about 1.0 weight percent of the total powder composition. Suitable anti-static agents include, but are not limited to, tetraalkyl ammonium salts as discussed previously and which also serve as catalysts. Other suitable antistatic agents include: alkyl poly (ethyleneoxy) phosphate or alkylaryl poly (ethyleneoxy) phosphates such as ethyl benzyl poly (ethyleneoxy) phosphate; polyethyleneimine; poly (2-vinyl pyrrolidone); pyridinium chloride; poly (vinyl pyridinium chloride); polyvinyl alcohol; and inorganic salts.

A plasticizer may be used in the powder coating compositions of this invention if desired. The types of plasticizers used very often include adipates, phosphates, phthalates, sebacates, polyesters derived from adipic acid or azelaic acid, and epoxy or epoxidized plasticizers. Exemplary of the many plasticizers which may be employed are: dihexyl adipate; diisoctyl adipate; dicyclohexyl adipate; triphenyl phosphate; tricresyl phosphate; tributyl phosphate; dibutyl phthalate; dioctylphthalate; butyl octyl phthalate; dioctyl sebacate; butyl benzyl sebacate; dibenzyl sebacate, butanediol-1,4-diglycidyl ether and cellulose acetate butyrate.

In order to give individual powder coating compositions a suitable color, a pigment may be included. In general the pigment forms from about 6 to about 35 weight percent of the total powder coating composition. Pigments which are suitable for powder coating compositions include, but are not limited to the following: basic lead silica chromate, 30 percent by weight (orange); titanium dioxide, 30 percent by weight (white); titanium dioxide, 15 weight percent, plus ultra marine blue, 10 weight percent (blue); phthalocyanine blue, 7 weight percent, plus titanium dioxide, 10 weight percent (blue); phthalocyanine green, 7 weight percent, plus titanium dioxide, 10 weight percent (green); ferrite yellow, 7 weight percent, plus titanium dioxide, 10 weight percent (yellow); carbon black, 6 weight percent (black); black iron oxide, 10 weight percent (black); chromium green oxide, 8 weight percent, plus titanium dioxide, 10 weight percent (green); quindo red, 5 weight percent, plus titanium dioxide, 16 weight percent (red); and iron oxide transparent orange pigment, 10 weight percent (orange). Metallic pigment such as aluminum may also be included up to 10 weight percent to give the baked coating a metallic appearance.

Having described the various materials which are employed in formulating the powder coating compositions of this invention, a plurality of examples are hereinafter set forth to illustrate the same. It should be understood that the specific examples are presented by way of illustration and not by way of limitation.

EXAMPLE I

The monomers, glycidyl methacrylate 15% by weight, methyl methacrylate 45% by weight and butyl methacrylate 40% by weight are mixed together. Three weight percent of a catalyst 2,2'-azobis (2-methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°C. – 112°C.) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 110°C. Drying is continued until the solvent content of the copolymer is below 3 percent.

The trays are cooled and the copolymer collected and ground to pass through 20 mesh screen. The copolymer has a glass transition temperature of 53°C. and a molecular weight ($\overline{M}_n$) of 4000.

A carboxy terminated polyamide is prepared in the following manner. Fifty parts of terephthalic acid and 21.6 parts of 1.4 phenylenediamine are introduced into a flask equipped with a condenser for distillation. The flask is then heated to 180°C. at which point distillation starts and the reaction is maintained at this temperature until distillation of all water is substantially complete. The temperature is then slowly raised to 230°C. and maintained for 2 to 3 hours. The contents of the flask are allowed to cool to 150°C. and then poured into an evaporating dish and cooled to room temperature. The product is ground and washed several times with 10% hydrochloric acid and water and followed by filtration and drying.

One hundred parts by weight of the ground epoxy copolymer and 35 parts by weight of the ground carboxyl terminated copolymer are mixed with the following materials:

| | | |
|---|---|---|
| Tetrabutyl ammonium bromide | 0.2 | parts |
| Polylauryl acrylate ($\overline{M}_n$=10,000) | 0.5 | parts |
| Titanium dioxide | 30 | parts |

The materials are mixed together in a ball mill for 2 hours. The mixture is mill rolled at 85°C. to 90°C. for 5 minutes. The solid obtained is ground is a ball mill to pass through a 140 mesh screen.

The resulting powder thus obtained is a powder coating composition of the invention. The powder is sprayed on an electrically grounded, steel panel by using an electrostatic powder spray gun operating at 50 KV charging voltage. After spraying, the panel is heated at 175°C. for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE II

The procedure of Example I is repeated with the exception that: (1) the copolymer comprises 8% by weight glycidyl methacrylate, 52% by weight methyl methacrylate and 40% by weight butyl methacrylate and has a glass transition temperature of 58°C. and a molecular weight of 4,000; and (2) 19 parts of the carboxyl terminated polyamide are employed. The quality of painted panels is about the same as achieved in Example I.

EXAMPLE III

The procedure of Example I is repeated with the exception that: (1) the carboxyl terminated polyamide is prepared by employing 56.4 parts of azelaic acid and 21.6 parts of 1,4 phenylenediamine as reactants; and (2) 35 parts by weight of the carboxyl terminated polyamide are combined with one hundred parts of copolymer as well as the other additives of Example I. Panels painted with the powders are of comparable quality with those of Example I.

EXAMPLE IV

A monomer mixture having the following composition is prepared: glycidyl acrylate 12% by weight, methyl methacrylate 58% by weight, and butyl methacrylate 30% by weight. The monomer mixture is processed in the same manner as described in Example I with 3% by weight of the catalyst AIBN employed. A carboxyl terminated polyamide is prepared as described in Example I except 50 grams of terephthalic acid are reacted with 23.2 grams of hexamethylenediamine. One hundred parts of the copolymer is mixed with the same additional ingredients described in Example I, except that 30 parts of the carboxyl terminated polyamide are employed.

The powder coating composition obtained by following the the process steps set forth in Example I is applied to test panels in the same manner as described in Example I. The coating is baked at a temperature of 170°C. for 30 minutes. The coating obtained has good adhesion to steel, glass, brass, zinc, aluminum, copper and bronze.

EXAMPLE V

A monomer mixture having the following composition is prepared: glycidyl acrylate 10% by weight, methyl methacrylate 50% by weight, butyl methacrylate 30% by weight and vinyl acetate 10% by weight. A copolymer is formed from this monomer mixture in accordance with the same procedure as is outlined in Example I. In this case, 3% by weight of the catalyst AIBN is added.

A carboxyl terminated polyamide is prepared as in Example I except that 68.8 parts of 1,4- cyclohexanedicarboxylic acid and 34.2 parts of 1,4 cyclohexane diamine are reacted.

One hundred parts of the epoxy copolymer and 34 parts of the carboxy terminated polyamide are mixed with the following materials:

| | | |
|---|---|---|
| Tetrabutylammonium bromide | 2 | parts |
| Poly (2-ethylhexyl acrylate) | 3.5 | parts |
| Carbon black | 6 | parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 160°C. for 10 minutes is of good quality. Also, the coating obtained on each test panel is insoluble in toluene, gasoline, methanol and butanone.

EXAMPLE VI

A monomer mixture having the following composition is prepared: glycidyl methacrylate 15% by weight, butyl acrylate 20% by weight and methyl methacrylate 65% by weight. The monomer is reacted as set forth in Example I in order to produce a copolymer. Four percent by weight of the catalyst AIBN is employed in reacting the monomer mixture to form the copolymer. The copolymer has a glass transition temperature of 50°C. and a molecular weight of 3000.

A carboxy terminated polyamide is prepared in accordance with the procedure of Example I with the exception that 34.8 parts of adipic acid, 33.4 parts of phthalic acid and 26.4 parts of tetramethylene diamine are reacted.

One hundred parts by weight of the copolymer and 45 parts by weight of the carboxyl terminated polyamide are mixed with the following:

| | | |
|---|---|---|
| Triethylene diamine | 0.1 | parts |
| Tetraethylammonium chloride | 0.5 | parts |
| Polylaurylmethacrylate ($\bar{M}_n$ = 6000) | 2 | parts |
| Phthaloycanine green | 7 | parts |
| Titanium dioxide | 10 | parts |

The above described materials are processed as described in Example I in order to produce a powder coating composition. The powder coating composition is applied to test panels as described in Example I and baked on the panels at a temperature of 150°C. for 15 minutes.

The coating obtained has good adhesion to steel, glass, brass, zinc, aluminum, copper and bronze and is insoluble in toluene, gasoline, methanol and butanone.

EXAMPLE VII

A monomer mixture having the following composition is prepared: glycidyl methacrylate 15% by weight, methyl methacrylate 50% by weight and styrene 35% by weight. The monomers are reacted in accordance with the procedure set forth in Example I with 3% by weight of the catalyst AIBN being utilized. The resulting ground copolymer has a molecular weight of 4500 and a glass transition temperature of 90°C.

A carboxyl terminated polyamide is prepared in accordance with the procedure of Example I except that 79.3 parts of glutaric acid and 37.0 parts of trimethylenediamine are reacted.

One hundred parts of the epoxy functional copolymer and 56 parts of the carboxyl terminated polyamide are mixed with the following materials:

| | | |
|---|---|---|
| Tetramethylammonium chloride | 1 | part |
| Poly (2-ethylhexyl acrylate) | 2 | parts |
| Ferrite yellow | 7 | parts |
| Titanium dioxide | 10 | parts |

This mixture is processed as described in Example I in order to form a powder coating composition. The powder coating composition is applied to test panels as described in Example I. The panels are baked at a temperature of 180°C. for 5 minutes. The adhesion quality of the powder coating after baking on the various test panels is good. The coating on each panel possesses good solvent and scratch resistance.

EXAMPLE VIII

A monomer mixture having the following composition is formed; glycidyl methacrylate 10% by weight, methyl methacrylate 33% by weight, isobutyl acrylate 27% by weight, alpha methyl styrene 15% by weight and methacrylonitrile 15% by weight. The monomer mixture is reacted in the same manner as described in Example I. Three percent of the catalyst AIBN is employed.

A carboxyl terminated polyamide is prepared in the manner described in Example I except that 61.2 parts of 4,4' sulfonyldibenzoic acid and 11.6 parts hexamethylene diamine are the reactants.

One hundred parts of the epoxy functional copolymer and 24 parts of the carboxyl terminated polyamide are mixed with the following:

| | parts |
|---|---|
| Dodecyldimethyl (2-phenoxy-ethyl) ammonium bromide | 0.5 |
| Polyethylene glycol perfluoro octonoate ($\bar{M}_n$=3400) | 2 |
| Black iron oxide | 10 |

The mixture so formed is processed as described in Example I to produce a powder coating composition. This powder coating composition is applied to test panels as it is described in Example I. The coated panels are baked at 165°C. for 15 minutes. The coating on each panel has good adhesion and solvent resistance.

EXAMPLE IX

A monomer mixture having the following composition is prepared: glycidyl methacrylate 20% by weight, methyl methacrylate 40% by weight and butyl methacrylate 40% by weight. A copolymer is formed from this monomer mixture in accordance with the same procedure as is outlined in Example 1. In this case, 6% by weight of the catalyst AIBN is added. The copolymer produced has a glass transition temperature of 51°C. and a molecular weight of 8500.

A carboxyl terminated polyamide is prepared in accordance with the procedure of Example I with the exception that 43.8 parts of adipic acid and 28 parts of 2,3-bicyclooctane diamine are reacted.

One hundred parts of the epoxy functional copolymer and 45 parts of the carboxyl terminated polyamide are mixed with the following:

| | | |
|---|---|---|
| Tetrabutylammonium chloride | 0.1 | parts |
| Polybutylacrylate ($\bar{M}_n$ = 9000) | 4 | parts |

| | |
|---|---|
| Titanium dioxide | 15 parts |
| Transparent blue | 4 parts |
| Metallic aluminum flakes | 4 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 200°C. for 10 minutes is of good quality, is solvent and scratch resistant, and has a metallic appearance.

EXAMPLE X

A monomer mixture having the following composition is formed: glycidyl acrylate 18% by weight, ethyl acrylate 15% by weight, methyl methacrylate 45% by weight, vinyl chloride 22% by weight. The monomer mixture is polymerized by using 2 weight percent of AIBN as the initiator.

A carboxyl terminated polyamide is prepared in the manner described in Example I except that 84.6 parts of azelaic acid and 14.6 parts of triethylene diamine are reacted.

One hundred parts of the epoxy functional copolymer and 32 parts of the carboxyl terminated polyamide are mixed with the following:

| | |
|---|---|
| Trimethyl benzyl ammonium chloride | 0.1 parts |
| Poly (2-ethylhexyl acrylate) ($\overline{M}_n$=11,000) | 2 parts |
| Carbon black | 6 parts |

The above materials are mixed and processed as set forth in Example I. The resulting powder coating composition is applied to test panels as specified in Example I. The coating composition is baked at 170°C. for 15 minutes. All the painted panels exhibit good adhesion and solvent resistant properties.

EXAMPLE XI

A monomer mixture is formed having the following composition: glycidyl methacrylate 12% by weight, methyl methacrylate 50% by weight, 2-ethylhexyl acrylate 10% by weight and acrylonitrile 28% by weight. The monomer mixture is processed as set forth in Example I in order to form a copolymer. Four percent by weight of the catalyst AIBN is added. The copolymer formed has a glass transition temperature of 60°C. and a molecular weight of 4,000.

A carboxyl terminated polyamide is prepared in accordance with the procedure of Example I except that 44.4 parts of phthalic anhydride and 36.8 parts of benzidine are reacted.

One hundred parts by weight of the epoxy functional copolymer and 32 parts by weight of the carboxyl terminated polyamide are mixed with the following:

One hundred parts by weight of the ground copolymer is mixed with the following materials:

| | parts |
|---|---|
| Phenolic hydroxy terminated resin | 112 |
| Stannous octoate | 0.5 |
| Tetraethylammonium bromide | .05 |
| Polyethylene glycol perfluoro octoate($\overline{M}_n$=3500) | 2 |
| Quindo red | 4 |
| Metallic aluminum flakes | 4 |

The mixture above described is processed as set forth in Example I to produce a powder coating composition. The powder coating composition is applied to test panels as described in Example I. The panels are baked at 150°C. for 20 minutes. The adhesion to the panels of the powder coating is good, each of the coatings possesses good solvent resistance and has a metallic appearance.

EXAMPLE XII

A monomer mixture having the following composition is prepared: glycidyl methacrylate 15% by weight, methyl methacrylate 32% by weight, ethyl acrylate 15% by weight, isobutyl acrylate 8% by weight, and styrene 30% by weight. A copolymer is formed from this monomer mixture in accordance with the same procedure as is outlined in Example I. In this case, 3% by weight of the catalyst AIBN is added.

A carboxyl terminated polyamide is prepared in accordance with the procedure of Example I except that 51 parts of azelaic acid are reacted with 21.6 parts of 1,4 phenylenediamine.

One hundred parts by weight of the epoxy functional copolymer and 36 parts by weight of the carboxyl terminated polyamide are mixed with the following materials:

| | |
|---|---|
| Tetraethylammonium bromide | 1 part |
| Polyisodecyl methacrylate ($\overline{M}_n$=5000) | 1.5 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 120°C. for 15 minutes is of good quality and has good adhesion characteristics. The powder coating composition on each panel is resistant to the solvents previously mentioned.

EXAMPLE XIII

A monomer mixture having the following composition is prepared: glycidyl acrylate 15% by weight, methyl methacrylate 40% by weight, 2-ethylhexyl acrylate 15% by weight, alpha methyl styrene 20% by weight and acrylonitrile 10% by weight. A copolymer is formed from this monomer mixture using 4% by weight of the catalyst AIBN.

A carboxyl terminated polyamide is prepared in accordance with the procedure of Example I with the exception that 40 parts of succinic anhydride are reacted with 60 parts of 4,4' diaminodiphenyl ether.

One hundred (100) parts by weight of the epoxy functional copolymer and fifty (50) parts by weight of the carboxyl terminated polyamide are mixed with the following materials:

| | |
|---|---|
| Tetraethylammonium bromide | 0.4 parts |
| Poly (2-ethylhexyl acrylate) | 2 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 170°C. for 20 minutes is of good quality and resistant to the aforementioned solvents.

EXAMPLE XIV

A monomer mixture having the following composition is prepared: glycidyl methacrylate 22% by weight, n-hexyl methacrylate 20% by weight, butyl methacrylate 25% by weight and acrylonitrile 33% by weight. A copolymer is formed from this monomer mixture in accordance with the same procedure as is outlined in Example I. In this case, 1.5% by weight of the catalyst AIBN is added. The copolymer produced has a glass transition temperature of 40°C. and a molecular weight of 7500.

A carboxyl terminated polyamide is prepared in accordance with the procedure of Example I except that 76.5 parts of azelaic anhydride are reacted with 14.6 parts of triethylene diamine.

One hundred (100) parts by weight of the epoxy functional copolymer and 30 parts of the carboxyl terminated polyamide are mixed with the following:

| | | |
|---|---|---|
| Zinc octoate | 0.8 | parts |
| Tetrabutylammonium iodide | 1.0 | parts |
| Polybutyl acrylate | 2.0 | parts |
| Iron oxide transparent orange | 4 | parts |
| Metallic aluminum flakes | 4 | parts |

The above ingredients are mixed together and processed in accordance with the procedure of Example 1 to obtain a powder coating composition. The powder coating composition is sprayed on various test panels of steel, glass, brass, zinc, aluminum, copper and bronze. The coating obtained on each test panel after curing of the powder coating composition at a temperature of 140°C. for 20 minutes is of good quality and is solvent and scratch resistant.

EXAMPLE XV

A monomer mixture having the following composition is prepared: glycidyl methacrylate 15% by weight, butyl methacrylate 15% by weight, ethyl acrylate 15% by weight, methyl methacrylate 30% by weight and styrene 25% by weight. A copolymer is formed from this monomer mixture in accordance with the same procedure as is outlined in Example I. In this case, 4% by weight of the catalyst AIBN is added.

A carboxyl terminated polyamide is prepared as follows:

In a blender jar is placed 33.6 grams of trans-2,5-dimethylpiperazine, 125 ml. of methylene chloride, 100 ml. of a 5% "Duponol" ME solution (surface active agent from DuPont) and 750 ml. of ice water containing 0.1 mole of sodium hydroxide. To the rapidly stirred system is added 95 grams of phthaloyl chloride in 125 ml. of methylene chloride. The polymerization mixture is stirred for 10 minutes, then poured into 5 liters of water and the methylene chloride boiled away on a steam bath.

The polymer is filtered and washed several times with 0.1 N hydrochloric acid and water and then dried in a vacuum oven. The polyamide so obtained contains carboxylic acid as its terminal groups.

One hundred parts by weight of the epoxy functional copolymer and 45 parts by weight of the above-prepared carboxyl terminated polyamide are mixed with the following:

| | | |
|---|---|---|
| Tetraethylammonium bromide | 1.0 | parts |
| Polylauryl acrylate | 0.5 | parts |
| Titanium dioxide | 30 | parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 130°C. for 30 minutes is of good quality and resistant to the aforementioned solvents.

EXAMPLE XVI

A monomer mixture having the following composition is prepared: glycidyl methacrylate 15% by weight, 2-ethylhexyl acrylate 10% by weight, methyl methacrylate 50% by weight, methacrylonitrile 15% by weight and alpha methyl styrene 10% by weight. A copolymer is formed from this monomer mixture in accordance with the same procedure as is outlined in Example I. In this case, 4% by weight of the catalyst AIBN is added.

A carboxyl terminated polyamide is prepared in accordance with the procedure of Example XV except that 55 grams of adipyl chloride are reacted with 42.4 grams of p,p'-diamino-benzophenone.

One hundred parts by weight of the epoxy functional copolymer and 45 parts by weight of the carboxyl terminated polyamide are mixed with the following:

| | | |
|---|---|---|
| Tetraethylammonium bromide | 0.5 | parts |
| Polylauryl acrylate | 2.5 | parts |
| Titanium dioxide | 30 | parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 135°C. for 30 minutes is of good quality. Also, the coatings are resistant to and insoluble in toluene, gasoline, methanol and butanone.

EXAMPLE XVII

A monomer mixture having the following composition is prepared: glycidyl acrylate 25% by weight, methyl methacrylate 50% by weight and butyl methacrylate 25% by weight. The monomers are reacted as described in Example I to produce a copolymer. In this case, 6% by weight of the catalyst AIBN is employed.

A carboxyl terminated polyamide is prepared by the procedure of Example XV except that 71.7 grams of sebacyl chloride is reacted with 36.8 grams of Benzidine.

One hundred parts by weight of the epoxy functional copolymer and 80 parts by weight of the carboxyl terminated polyamide are mixed with:

| | | |
|---|---|---|
| 2-methyl-4-ethylimidazole | 0.05 | parts |
| Dibutyl poly (ethyleneoxy phosphate) | 0.05 | parts |
| Polyisododecyl methacrylate | 4 | parts |
| Titanium dioxide | 10 | parts |
| Phthalocyanine blue | 7 | parts |

A powder coating composition is obtained by following the process steps set forth in Example I. The coating composition is applied to a series of test panels and baked at the temperature of and for the same time as Example VII. The coating obtained on the various test panels is of good quality with respect to its adhesion, appearance and impact characteristics.

EXAMPLE XVIII

A monomer mixture having the following composition is prepared: glycidyl methacrylate 10% by weight, methyl methacrylate 67% by weight, and n-butyl methacrylate 23% by weight. A copolymer is formed from this monomer mixture in accordance with the procedure as is outlined in Example I. In this case, 4% by weight of the catalyst AIBN is added. The copolymer produced has a glass transition temperature of 75°C. and a molecular weight of 3000.

A carboxyl terminated polyamide is prepared as in Example XV except that 81.2 grams of isophthaloyl chloride is reacted with 34.8 grams of hexamethylene diamine.

One hundred parts by weight of the epoxy functional copolymer and 40 parts by weight of the carboxyl terminated polyamide are mixed with the following:

| | | |
|---|---|---|
| Tetrabutylammonium chloride | 0.7 | parts |
| Polybutyl acrylate | 2 | parts |
| Titanium dioxide | 30 | parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 180°C. for 15 minutes is of good quality. Also, each of the test panels coatings is resistant to and insoluble in toluene, gasoline, methanol and butanone.

EXAMPLE XIX

A monomer mixture having the following composition is prepared: glycidyl acrylate 30% by weight, methyl methacrylate 60% by weight, and n-butyl methacrylate 10% by weight. A copolymer is formed from this monomer mixture in accordance with the procedure as is outlined in Example I. In this case, 4% by weight of the catalyst AIBN is added.

A carboxyl terminated polyamide is prepared as in Example XV except that 84 grams of 4,4' Biphenyl - dicarbonyl chloride are reacted with 26 grams of heptamethylene diamine.

One hundred parts by weight of the epoxy functional copolymer and 37 parts by weight of the carboxyl terminated polyamide are mixed with:

| | | |
|---|---|---|
| Tetrabutylammonium chloride | 0.7 | parts |
| Polybutyl acrylate | 2 | parts |
| Titanium dioxide | 30 | parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 170°C. for 15 minutes is of good quality. Also, each of the test panels coatings is resistant to and insoluble in toluene, gasoline, methanol and butanone.

EXAMPLE XX

The procedure of Example I is repeated with the exception that an equivalent amount of polydimethyl siloxane ($\overline{M}_n$=5,000) is substituted for the polylauryl acrylate as the flow control agent.

EXAMPLE XXI

Examples I – XIX are repeated with the exception that the flow control agent is omitted from the powder composition. The powders are sprayed on steel test panels are cured to form films thereon.

EXAMPLE XXII

The procedure of Example V is repeated with the exception that 0.8 parts of polydiphenyl siloxane ($\overline{M}_n$=10,000) is substituted for the poly (2-ethylhexyl acrylate) as the flow control agent.

EXAMPLE XXIII

The procedure of Example XV is repeated with the exception that 0.5 parts of polymethylphenylsiloxane ($\overline{M}_n$=8,000) is used as the flow control agent.

EXAMPLE XXIV

The procedure of Example VII is repeated with the exception that 0.4 part of poly (3,3,3-trifluoropropylmethyl (loxane) ($\overline{M}_m$ = 6,000) is substituted as the flow control agent.

EXAMPLE XXV

The procedure of Example XIII is repeated with the exception that 0.7 parts of poly (perfluorodomethyl siloxane) ($\overline{M}_n$=11,000) is substituted for the flow control agent.

EXAMPLE XXVI

The procedure of Example XVI is repeated with the exception that .30 parts of poly (pentafluorophenyl methyl siloxane)($\overline{M}_n$ = 15,000) is substituted as the flow control agent.

In view of this disclosure, many modifications of this invention will be apparent to those skilled in the art. It is intended that all such modifications which fall within the true scope of this invention be included within the terms of the appended claims.

We claim:

1. A powder coating composition which, exclusive of pigments and other non-reactive components, comprises a coreactable mixture of:
   A. a copolymer of about 8 to about 30 weight percent of a glycidyl ester of a monoethylenically unsaturated acid and about 92 to about 70 weight percent of other monoethylenically unsaturated monomers, said copolymer having a glass transition temperature in the range of 40°C to 90°C and a molecular weight ($\overline{M}_n$) in the range of 2500 to 8500;

B. a carboxyl terminated polyamide in the amount of between about 0.8 and about 1.2 carboxyl groups for each epoxy group in the copolymer; and C. from about 0.05 weight percent to about 4.0 weight percent based on the total weight of the total coating composition of a polymeric flow control agent.

2. A powder coating composition in accordance with claim 1 wherein said copolymer has a glass transition temperature between about 50°C. and about 80°C. and a molecular weight ($\overline{M}_n$) between about 3000 and about 6500, said glycidyl ester being present in said copolymer from at least about 10 percent by weight to no more than about 25 percent by weight.

3. A powder coating composition in accordance with claim 1 wherein said copolymer has a glass transition temperature between about 55°C. and about 70°C. and a molecular weight ($\overline{M}_n$) in the range of about 3000 to about 4000, said glycidyl ester being present in said copolymer from at least about 12 percent by weight to no more than about 20 percent by weight.

4. A powder coating composition in accordance with claim 1 wherein said carboxyl terminated polyamide has a molecular weight ($\overline{M}_n$) between about 500 and about 3,000.

5. A powder coating composition in accordance with claim 1 wherein said carboxyl terminated polyamide has a molecular weight ($\overline{M}_n$) between about 700 and about 1500.

6. A powder coating composition in accordance with claim 1 wherein said monoethylenically unsaturated monomers consist essentially of monofunctional, alpha-beta olefinically unsaturated monomers.

7. A powder coating composition in accordance with claim 6 wherein said monofunctional, alpha-beta olefinically unsaturated monomers are acrylates.

8. A powder coating composition which, exclusive of pigments and other non-reactive components, comprises a coreactable mixture of:

A. a copolymer of about 8 to about 30 weight percent of a glycidyl ester of a monoethylenically unsaturated acid and about 92 to about 70 weight percent of other monoethylenically unsaturated monomers, said copolymer having a glass transition temperature between about 40°C and about 90°C and a molecular weight ($\overline{M}_n$) between about 2500 and about 8500;

B. a carboxyl terminated polyamide in the amount of between about 0.8 and about 1.2 carboxyl groups for each epoxy group in the copolymer, and said carboxyl terminated polyamide having the general structure:

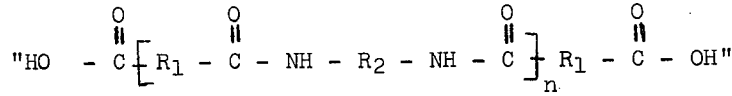

where
$n = 1$ to 10; and $R_1$ and $R_2=$
1. alkyl groups containing 2 – 12 carbon atoms
2. aromatic groups
3. heterocyclic groups
4. alicyclic groups; and C. from about 0.05 weight percent to about 4.0 weight percent based on the total weight of the total coating composition of a polymeric flow control agent.

9. A powder coating composition in accordance with claim 8 wherein said copolymer has a glass transition temperature between about 50°C. and about 80°C. and a molecular weight ($\overline{M}_n$) between about 3000 and about 6500, said glycidyl ester being present in said copolymer from at least about 10 percent by weight to no more than about 25 percent by weight.

10. A powder coating composition in accordance with claim 8 wherein said copolymer has a glass transition temperature between about 55°C. and about 70°C. and a molecular weight ($\overline{M}_n$) in the range of about 3000 to about 4000, said glycidyl ester being present in said copolymer from at least about 12 percent by weight to no more than about 20 percent by weight.

11. A powder coating composition in accordance with claim 8 wherein said carboxyl terminated polyamide has a molecular weight ($\overline{M}_n$) between about 500 and about 3,000.

12. A powder coating composition in accordance with claim 8 wherein said carboxyl terminated polyamide has a molecular weight ($\overline{M}_n$) between about 700 and about 1500.

13. A powder coating composition in accordance with claim 8 wherein said carboxyl terminated polyamide is prepared by reacting a dicarboxylic acid and a diamine.

14. A powder coating composition in accordance with claim 8 wherein said carboxyl terminated polyamide is prepared by reacting a diacyl halide and a diamine.

15. A powder coating composition in accordance with claim 8 wherein said carboxyl terminated polyamide is prepared by reacting a dicarboxylic anhydride and a diamine.

16. A powder coating composition in accordance with claim 8 wherein said monoethylenically unsaturated monomers consist essentially of monofunctional, alpha-beta olefinically unsaturated monomers.

17. A powder coating composition in accordance with claim 16 wherein said monofunctional, alpha-beta olefinically unsaturated monomers are acrylates.

18. A powder coating composition in accordance with claim 17 wherein said acrylates consist essentially of esters of $C_1$–$C_8$ monohydric alcohols and acrylic or methacrylic acid.

19. A powder coating composition in accordance with claim 16 wherein said monofunctional, alpha-beta olefinically unsaturated monomers consist essentially of a mixture of acrylates and vinyl hydrocarbons, said acrylates comprising greater than 50 weight percent of the monomer content of the copolymer.

20. A powder coating composition in accordance with claim 19 wherein said vinyl hydrocarbons are selected from the group consisting of styrene, alpha methyl styrene, vinyl toluene, t-butyl styrene and chlorostyrene.

21. A powder coating composition in accordance with claim 16 wherein said copolymer includes up to 35 weight percent of modifying monomers selected from the group consisting of vinyl chloride, acrylonitrile, methacrylonitrile and vinyl acetate.

* * * * *

UNITED STATES PATENT OFFICE
CERTIFICATE OF CORRECTION

Patent No. 3,880,947  Dated April 29, 1976

Inventor(s) Santokh S. Labana et al.

It is certified that error appears in the above-identified patent and that said Letters Patent are hereby corrected as shown below:

The term of this patent subsequent to December 25, 1990, has been disclaimed.

Signed and Sealed this

*twenty-second* Day of *June 1976*

[SEAL]

Attest:

RUTH C. MASON
*Attesting Officer*

C. MARSHALL DANN
*Commissioner of Patents and Trademarks*